United States Patent [19]
Ohkawa

[11] Patent Number: 5,477,286
[45] Date of Patent: Dec. 19, 1995

[54] SYSTEM UNIT FOR ADJUSTING OPERATION OF CAMERA

[75] Inventor: Shinichi Ohkawa, Omiya, Japan

[73] Assignee: Fuji Photo Optical Co., Saitama, Japan

[21] Appl. No.: 286,429

[22] Filed: Aug. 5, 1994

[30] Foreign Application Priority Data

Nov. 8, 1993 [JP] Japan .................................. 5-219090
Nov. 8, 1993 [JP] Japan .................................. 5-219091

[51] Int. Cl.⁶ .............................. G03B 7/00; G03B 17/00
[52] U.S. Cl. ........................ 354/21; 354/289.12; 354/412
[58] Field of Search ................................ 354/21, 289.12, 354/412

[56] References Cited

U.S. PATENT DOCUMENTS

| | | | |
|---|---|---|---|
| 4,423,934 | 1/1984 | Lambeth et al. | 354/412 |
| 4,693,574 | 9/1987 | Ohnuki et al. | 354/21 |
| 4,714,332 | 12/1987 | Eguchi et al. | 354/21 |
| 4,887,105 | 12/1989 | Ishikawa et al. | 354/21 |
| 4,903,055 | 2/1990 | Lourette et al. | 354/21 |
| 4,945,365 | 7/1990 | Fujino | 354/21 |
| 5,253,009 | 10/1993 | Satou et al. | 354/412 |

*Primary Examiner*—Michael L. Gellner
*Assistant Examiner*—Eddie C. Lee
*Attorney, Agent, or Firm*—Ronald R. Snider

[57] ABSTRACT

The present invention discloses a system unit for adjusting the operation of a camera that is capable of stably bringing a probe into contact with adjustment contacts without using a film information detection (DX) contact. The apparatus has pin receiving holes in a film patrone chamber of the camera at positions different from positions of holes for contacts for detecting film information so that contact pins of the probe are straight inserted into the pin receiving holes to establish the connection between the probe and a circuit in the camera for the purpose of adjusting the operations of the camera. In this case, the exposure detection portion and the probe can be attached to one chassis. If a camera of a type loading a film patrone from the bottom portion thereof is adjusted, a probe is enabled to be inserted from the bottom portion of the film patrone chamber, and the probe is provided with a movable portion that causes contact pins to project from retracted positions toward the wall of the film patrone chamber so as to be inserted into the pin receiving holes. Thus, the contact pins can easily be set.

4 Claims, 4 Drawing Sheets

SYSTEM UNIT FOR ADJUSTING OPERATION OF CAMERA

BACKGROUND OF THE INVENTION

This application claims the priority of Japanese Patent Application Nos. 5-219090 and 5-219091 filed on Aug. 11, 1993, which are incorporated herein by reference.

1. Field of the Invention

The present invention relates to a system unit for adjusting the operation of a camera, and more particularly to the structure of a system for setting and adjusting operation conditions of a camera at the final stage of the process for manufacturing the camera.

2. Description of the Prior Art

Recently, the final adjustment of the photographing operation of a camera has been performed by using an adjustment machine having a probe for transmitting (communicating) a signal. Thus, an accurate operation of the camera can be assured while saving labor at the time of performing the adjustment. FIG. 6 shows an example of the adjustment system that comprises a probe connecting portion 3, which can be covered with a decoration cover 2, the prove connecting portion 3 being formed in the front surface of a camera 1. The probe connecting portion 3 includes pin receiver holes 4 formed therein, the pin receiver holes 4 each including an adjustment contact. A probe 6 of an adjustment machine 5 has a plurality of contact pins 7. Therefore, when the contact pins 7 of the probe 6 are inserted into the pin receiver holes 4 and the connections with the adjustment contacts are established, signals can be transmitted between the adjustment machine 5 and an MPU or the like in the camera 1. When an adjustment relating to, for example, exposure, is performed, an exposure quantity detection portion (omitted from illustration) is disposed in an aperture portion of the camera 1 in order to detect an actual exposure quantity.

Thus, an operation signal is transmitted from the adjustment machine 5 to the camera 1. In response to this, the camera 1 performs a predetermined photographing operation. At this time, whether or not the photographing operation is a normal operation in accordance with a predetermined standard is judged. As for exposure for example, an actual quantity of exposure is detected by an exposure quantity detection portion, and a judgment is made in accordance with the detected value. If the detected value is different from a reference value, the adjustment machine 5 calculates the difference from the reference value as a value to be corrected. The value to be corrected is written on a memory of a ROM or the like included in the camera 1. Thus, the photographing operation for each camera is adjusted.

However, the foregoing adjustment system unit having the structure as shown in FIG. 6 such that the probe connecting portion 3 is formed in the front surface of the camera 1 and the decoration cover 2 is attached to the probe connecting portion 3 encounters a problem that a cost for forming the decoration cover 2 and the probe connecting portion 3 cannot be reduced. What is worse, another problem rises in that a process for attaching the decoration cover 2 is too complicated and the presence of the decoration cover 2 limits the design of the camera.

Accordingly, a contact for detecting a DX code, which is information of the film, has been used as the contact in the probe connecting portion. That is, FIG. 7 shows the reverse side of the camera 1 having a structure that DX-code detecting contacts 9 project into a film patrone chamber 8 for accommodating a film patrone over the inner wall of the film patrone chamber 8. The detecting contacts 9 are usually used to read information of the DX code added to the outer surface of the film patrone. However, the detecting contacts 9 can be used as adjustment contacts acting when the foregoing operation of the camera is adjusted.

However, the location of the detecting contacts 9 in the curved corner portion of the film patrone chamber 8 adjacent to an aperture 10 caused from the relationship with the position of the DX code disposed on the outer surface of the patrone raises a problem that a satisfactory contact of the probe cannot easily be realized. That is, since the structure is arranged such that the detecting contacts 9 project over the wall of the corner portion of the film patrone chamber 8 toward a patrone shaft, the probe 6 arranged as shown in FIG. 4 cannot maintain the state of contact with the detecting contacts 9. In order to obtain a stable state of contact, a probe having a special shape must be manufactured.

There arises another problem in that the conventional adjustment work has been performed such that the probe 6 and the exposure quantity detection portion are individually disposed at predetermined positions in the camera 1 and accordingly the adjustment work is too complicated.

SUMMARY OF THE INVENTION

The present invention is directed to overcome the foregoing problems and therefore an object of the present invention is to provide a system unit for adjusting the operation of a camera that is capable of stably bringing a probe into contact with adjustment contacts and quickly completing an adjustment operation without disposing a probe connection portion on the front surface of the camera and without using film information detection contacts disposed in a corner portion of a film patrone chamber.

Cameras of a simple-loading type (for example, DIL-Drop in Loading (trade name) type) that receives a film patrone chamber inserted from the bottom portion thereof encounters a difficulty to set a probe 6 arranged as shown in FIG. 6 to a predetermined position in the film patrone chamber. That is, since the simple-loading type camera comprises a frame member disposed on the reverse cover side of the film patrone chamber to guide the patrone and has the structure that the frame member is covered with the reverse cover, insertion of the probe cannot easily be performed and therefore the contact pins cannot easily be connected to predetermined positions in the film patrone chamber.

Another object of the present invention is to provide a system unit for adjusting the operation of a camera which is adaptable to a simple-loading type camera and capable of easily setting probe pins and stably establishing the connections between the probe pins and contacts of the camera.

In order to overcome the foregoing problems, a system unit for adjusting the operation of a camera according to the present invention comprises: an adjustment machine for adjusting a variety of operations of a camera; a probe having contact pins to transmit signals between the adjustment machine and a circuit in the camera; pin receiving holes formed in a film patrone chamber of the camera at positions which are different from positions of holes for contacts for detecting film information and at which the contact pins of the probe can be inserted straight; and adjustment contacts disposed on the reverse side of the pin receiving holes, connected to the circuit in the camera and arranged to be brought into contact with the contact pins inserted through the pin receiving holes so as to establish the connection between the probe and the circuit in the camera.

The foregoing structure may be constituted in such a manner that an exposure detection portion disposed to serve as a portion of the adjustment machine and the probe are attached to one chassis such that setting of the exposure detection portion to an aperture portion of the camera and setting of the probe to a film patrone chamber can be performed simultaneously.

As a result of the foregoing structures, the probe can be made to face the film patrone chamber and its contact pins can simply be inserted into the pin receiving holes. Therefore, the connections between the contact pins and the adjustment contacts can easily be established. Since the pin receiving holes for receiving the probe are formed in the film patrone chamber, the necessity of disposing the probe connection portion in a visible portion, such as in the front surface of the camera, can be eliminated. By attaching the probe to the chassis (the attachment plate) together with the exposure detection portion, they can simultaneously be set to the predetermined positions in the camera. Therefore, the adjustment work can be facilitated.

In order to be adaptable to a camera of the DIL (Drop In Loading) type, the structure is arranged such that a probe is formed to have a size which permits the probe to be inserted from a bottom portion of the film patrone chamber of the camera of a type loading a film patrone from the bottom portion, and the probe has a movable portion for inserting, into the pin receiving holes formed in a wall surface of the film patrone chamber when contact pins of the probe are projected, the contact pins of the probe which are held so as to be moved forwards/rearwards to project toward a wall of the film patrone chamber from an accommodating position in the probe so that the connection between the contact pins and adjustment contacts of the camera is established.

The foregoing structure may have an engagement portion is disposed in the bottom portion of the probe, the engagement portion being arranged to project toward the camera integrally with the movable portion so as to be engaged to a groove portion of the camera so that the probe disposed in the film patrone chamber is secured.

As a result of the foregoing structure, when the probe is inserted from the bottom portion of the camera into the film patrone chamber and the movable portion is moved toward the wall of the film patrone chamber, the projecting contact pins are inserted into the pin receiving holes so that the contact pins and the contacts of the camera can easily be contacted to one another. In the case where the engagement portion is integrally formed with the movable portion, the engagement portion is engaged to the groove portion of the camera housing. As a result, the probe can satisfactorily be secured in the film patrone chamber. After the adjustment has been completed, retracting of the movable portion to the original position causes the contact pins to be completely accommodated in the probe. Thus, the probe can be removed from the film patrone chamber in the foregoing state.

Other and further objects, features and advantages of the invention will be appear more fully from the following description.

BRIEF DESCRIPTION OF THE DRAWINGS

FIG. 5 shows the structure of the probe according to the second embodiment, in which

DESCRIPTION OF THE PREFERRED EMBODIMENTS

First Embodiment

Figure 1:
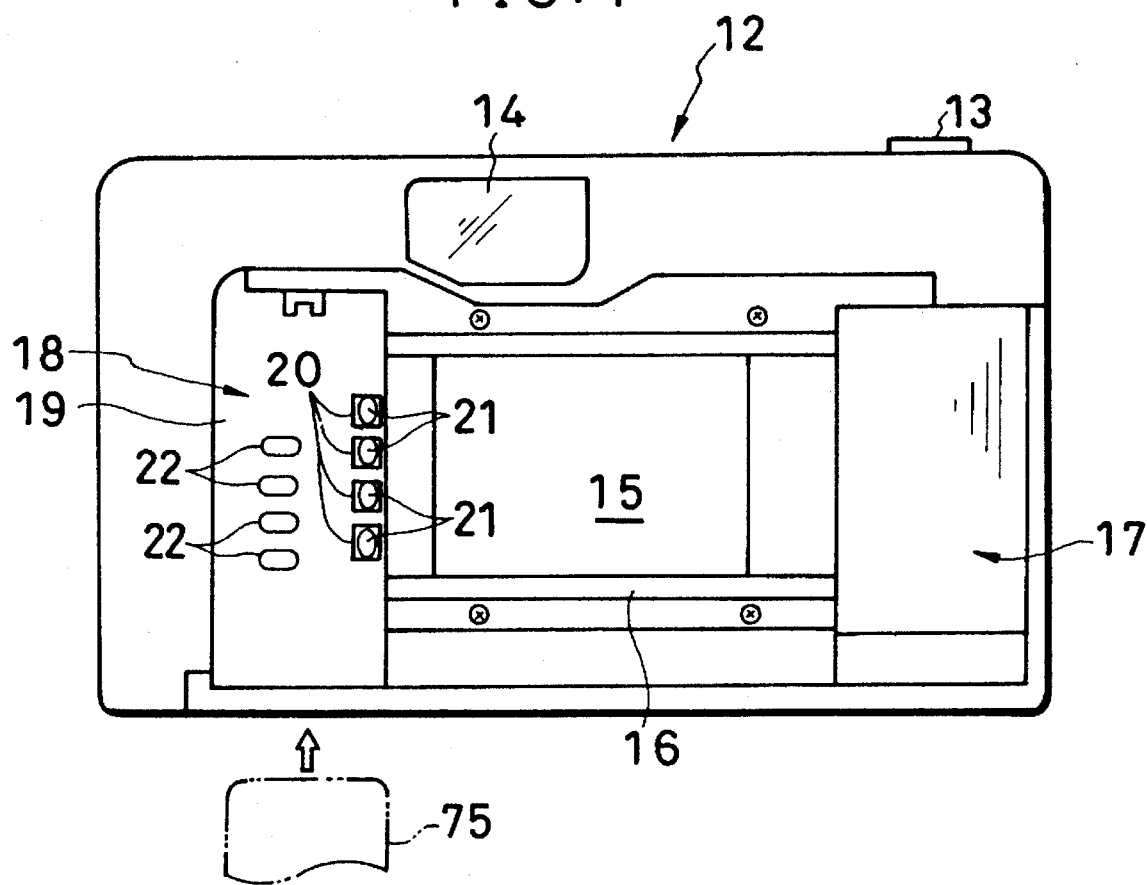
FIG. 1 shows the reverse side of a camera that is a portion of a system unit for adjusting the operation of a camera according to a first embodiment of the present invention.

FIG. 1 shows the reverse side of a camera serving as a portion of an adjustment system of the camera operation according to a first embodiment in a state where a reverse cover of the camera has been removed. As shown in FIG. 1, a camera 12 comprises a shutter button 13 and a finder 14, the camera 12 having an aperture 15 formed therein. Thus, a film is caused to move along an aperture surface 16 in the rear of the aperture 15. A film winding chamber 17 is disposed to the right of the aperture 15, while the film patrone chamber 18 is disposed to the left of the same. The film patrone chamber 18 comprises a semi-columnar wall member (housing) 19 having a plurality of film information detection contacts (DX contacts) 21 through holes 20 similarly to the conventional structure.

Figure 2:
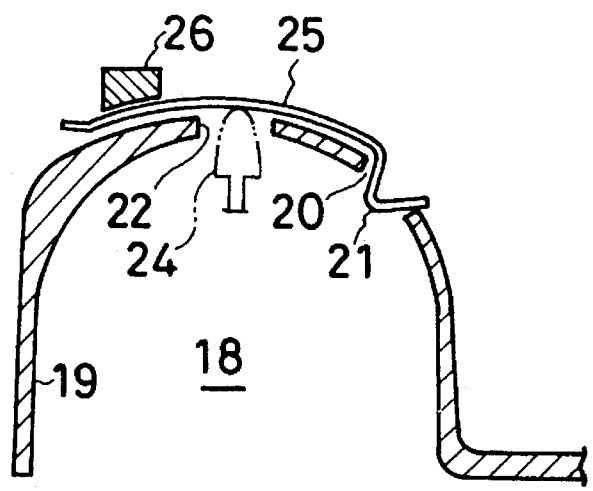
FIG. 2 is a cross sectional view of the film patrone chamber according to the first embodiment taken horizontally.

FIG. 2 shows a horizontal cross section of the film patrone chamber 18. As shown in FIG. 2, the holes 20 are formed in the corner portion of the wall member 19 so that the DX contacts 21 project through the holes 20. Individually from the holes 20 for the DX contacts 21, plural pin receiving holes 22 are, in the vertical direction, formed in the wall member 19. The pin receiving holes 22 are formed in the front surface (in the front surface of the camera or in a surface running parallel to the aperture surface 16) of the film patrone chamber 18 in order to insert straight probe contact pins 24. The DX contacts 21 are connected to an elongate-spring-shape terminal plate 25. The terminal plate 25 is supported by a support portion 26 while being disposed in front of the pin receiving holes 22. Therefore, the probe contact pins 24, inserted through the pin receiving holes 22, are brought into contact with the terminal plate 25. Thus, the terminal plate 25 serves as the adjustment contact and also serves as a terminal for detecting the DX code.

Figure 3:
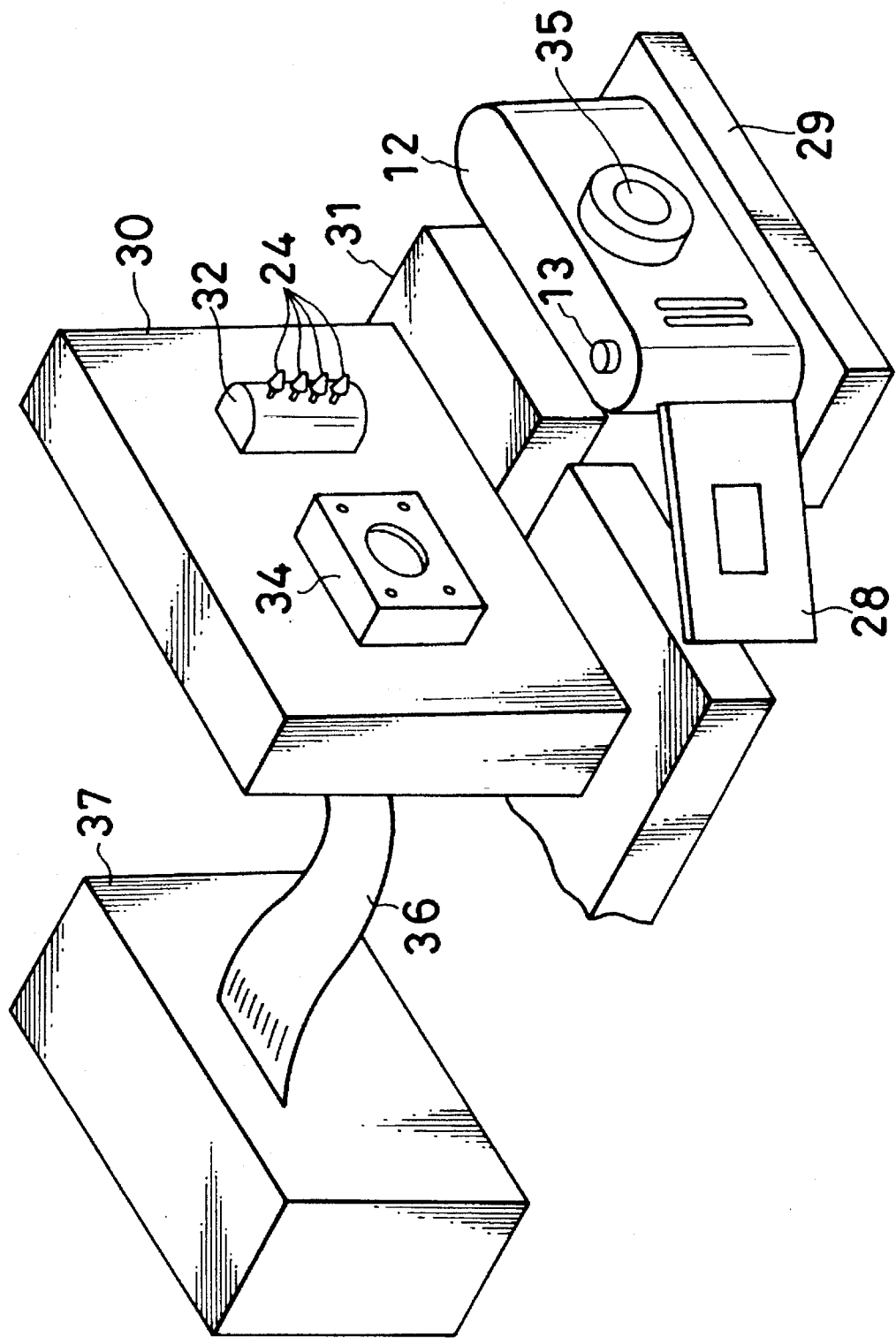
FIG. 3 is an overall view of the adjustment system unit according to the first embodiment.

FIG. 3 shows the overall body of the system unit for adjusting the operation of a camera according to this embodiment. The camera 12 is secured to a receiving frame 29 in a state where a reverse cover 28 has been removed. A chassis (an attachment plate) 30 is disposed in the rear of the camera 12 while being guided by guide rails 31. A probe 32 having the contact pins 24 is attached to the chassis 30. The probe 32 is formed into a semi-columnar shape having a width which is the same as the width of the inlet portion of the film patrone chamber 18. The probe 32 has, at the leading portion thereof, a plurality of contact pins 24 formed in the vertical direction thereof. When the probe 32 is received by the film patrone chamber 18, the contact pins 24 are inserted into the pin receiving holes 22.

An exposure detection portion 34 is attached to the chassis 30, the exposure detection portion 34 being disposed so as to be brought into contact with the aperture surface 16 when the probe 32 has been moved into the film patrone chamber 18. The exposure detection portion 34 detects the quantity of exposure when a picture has been taken with a photographing lens 35 of the camera 12. The probe 32 and the exposure detection portion 34 are, through a signal line 36, connected to an adjustment machine body 37 so that a value detected by the exposure detection portion 34 is supplied to the adjustment machine body 37 so as to be subjected to a comparison with a reference value.

The operation of the thus-constituted first embodiment will now be described. The adjustment operation is performed as shown in FIG. 3 such that the camera 12 is secured to a predetermined position on the receiving frame 29. Then, the chassis 30 is moved to the reverse side of the camera 12 while being guided by the guide rails 31. As a result, the probe 32 is straight introduced into the film patrone chamber 18. When the contact pins 24 are, as shown in FIG. 2, inserted into the pin receiving holes 22 and brought into contact with the terminal plate 25 under sufficient pressure, the chassis 30 is stopped. At this time, also the exposure detection portion 34 is brought into contact with the aperture surface 16 shown in FIG. 1. In the foregoing state, the chassis 30 is secured by a fixing lever (omitted from illustration).

In a case where adjustment relating to exposure is performed, a predetermined lamp is disposed in front of the camera 12 for example so that a reference photographing state has been determined. When the adjustment operation is commenced in the foregoing state, a signal for controlling the photography is supplied into the camera 12 from the adjustment machine body 37 through the probe 32 (the contact pins 24). When the camera 12 has started the photographing operation, the exposure detection portion 34 detects the quantity of exposure through the aperture 15, the detected value being supplied to the adjustment machine body 37. Then, the adjustment machine body 37 subjects the foregoing detected value and the reference value to a comparison. If they are different from each other, its correction value is supplied into the camera 12 through the probe 32. In the camera 12, correction data according to the correction value is written on a memory such as a ROM.

Since the contact pins 24 disposed in the leading portion of the probe 32 are straight inserted into the pin receiving holes 22 formed in the front surface (the surface running in parallel to the aperture surface) of the film patrone chamber 18, the connections between the contact pins 24 and the terminal plate 25 can easily be established for the purpose of transmitting the signal without the necessity of using the DX contacts 21.

Although the foregoing embodiment has the arrangement that the plural pin receiving holes 22 are, in the vertical direction, formed in the front surface of the film patrone chamber 18, the pin receiving holes 22 may be disposed at positions somewhat deviated from the front surface or in the lateral direction if the pin receiving holes 22 are in the form through which the contact pins 24 can be inserted straight.

Although the adjustment terminal plate 25 is disposed on only the reverse side of the pin receiving holes 22, the terminal plate 25 may extend to reach the outer surface of the pin receiving holes 22. Another structure may be employed in which an adjustment terminal plate is disposed individually from the terminal plate for the DX contacts 21.

As described above, according to the present invention, the pin receiving holes, through which the contact pins at the leading portion of the probe can be inserted straight into the film patrone chamber, are formed and the contact pins can be brought into contact with the adjustment contacts through the pin receiving holes. Therefore, an advantage can be realized in that the connections can stably be established between the contact pins and the adjustment contacts for transmitting the signal by means of the probe without using DX contacts. Furthermore, the necessity of disposing the connection portion for transmitting the signal in the front surface of the camera can be eliminated and therefore the operation or the like for attaching the decoration cover or the like can be omitted and the cost can be reduced. In addition, an influence upon the appearance of the camera can be prevented.

Since the exposure detection portion and the probe are attached to the same chassis and they are simultaneously set to the predetermined positions in the camera, an advantage can be realized in that the labor for individually setting each member can be omitted and the adjustment operation can quickly be completed.

Second Embodiment

Figure 4:
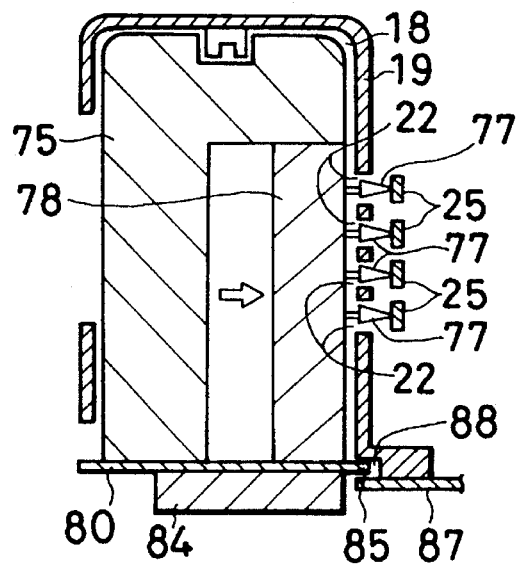
FIG. 4 is a central cross sectional view showing a state where a probe of the system unit for adjusting the operation of a camera according to a second embodiment of the present invention is set in the camera.
Figure 5A:
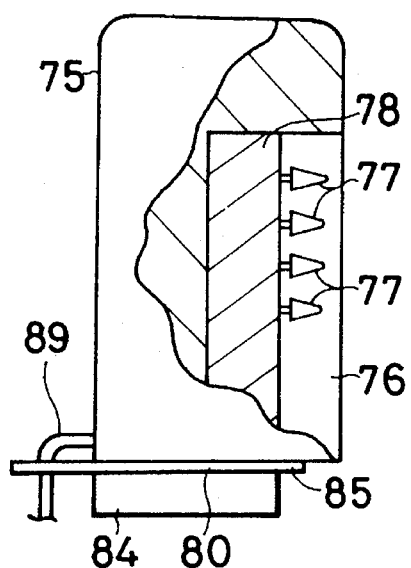
FIG. 5A is a partial cross sectional view.
Figure 5B:
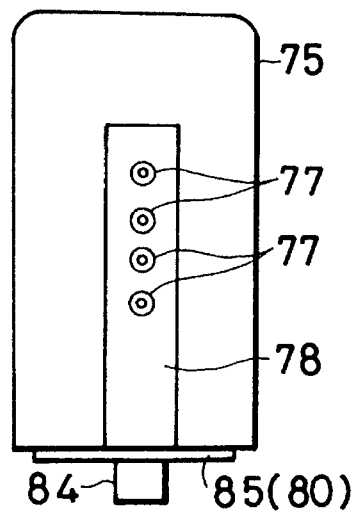
FIG. 5B is a front view and FIG. 5C is a bottom view.

FIG. 4 shows a state where a probe according to a second embodiment is set into a film patrone chamber. FIG. 5 shows the structure of the probe. In this embodiment, the camera 12 shown in FIG. 1 is in the form of a simple-loading-type (for example, the DIL type) camera arranged such that the film patrone chamber is loaded into the film patrone chamber 18 from the bottom portion of the camera 12.

Figure 5C:
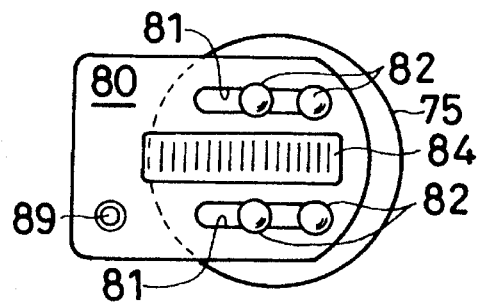
Figure 6:
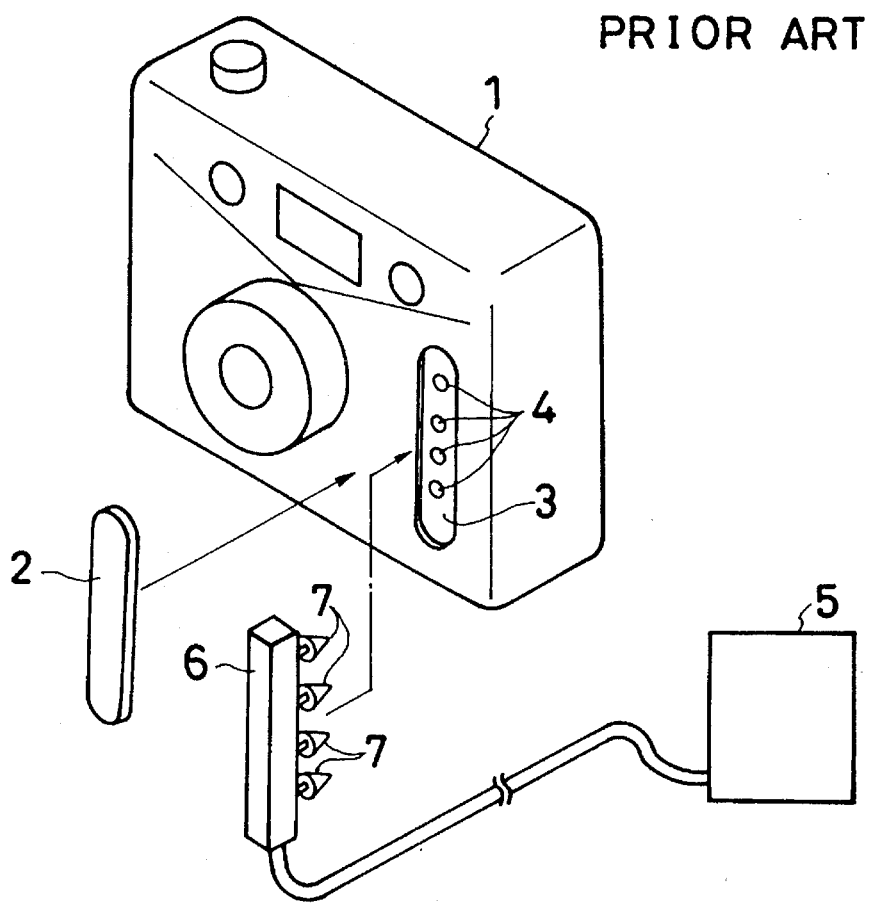
FIG. 6 is a perspective view showing the schematic structure of a conventional system unit for adjusting the operation of a camera.
Figure 7:
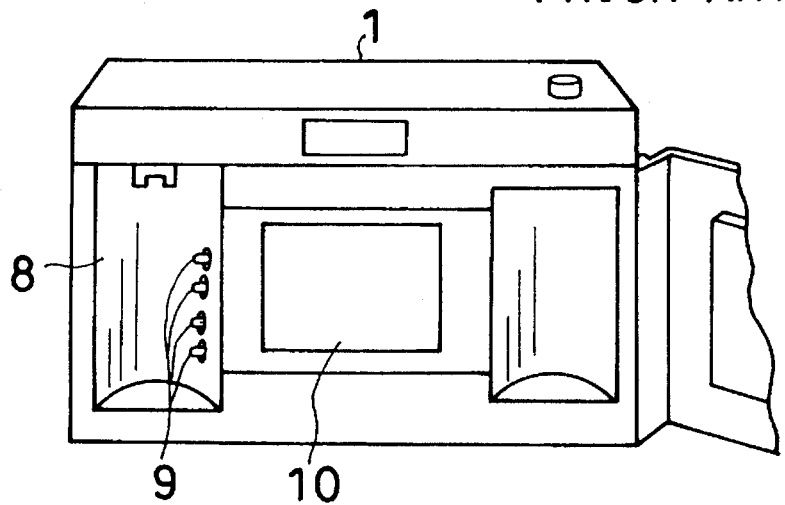
FIG. 7 is a perspective view showing the reverse side of a conventional camera.

The illustrated probe 75 has a size and shape with which it can be inserted into the film patrone chamber 18 through an opening in the bottom surface, preferably a cylindrical shape that can be received by the film patrone chamber 18. A movable portion 78 holding a plurality of contact pins 77 is disposed in an accommodating space 76 in the probe 75 so as to be capable of inserting/removing to and from the accommodating space 76. That is, FIG. 5A shows an accommodating position from which the movable portion 78 can be moved to a position shown in FIG. 4. The movable portion 78 is integrally supported by a support plate 80. The support plate 80 is, as shown in FIG. 5C, attached such that two guide grooves 81 are slidably fastened by two pairs of pins 82 each pair consisting of two pins 82 disposed on the probe 75. Further, an operation portion 84 that can be operated by the finger or the like is disposed below the support plate 80. By moving the operation portion 84 in the horizontal direction when viewed in the drawings, the contact pins 77 can be projected or removed.

An engagement portion 85 projecting over the outer surface of the probe 75 and engaging with the groove portion in the camera 12 is disposed in the leading portion (adjacent to the contact pins 77) of the support plate 80. That is, a groove portion 88 is, from a housing plate 87 in the bottom, formed in the bottom portion of the wall member 19 forming the film patrone chamber 18, as shown in FIG. 1. The projecting engagement portion 85 is engaged to the groove portion 88. Note that a lead wire 89 shown in FIG. 5A establishes the connection between the contact pins 77 and an adjustment machine (omitted from illustration).

The operation of the thus-constituted second embodiment will now be described. The adjustment operation is, as shown in FIG. 1, performed such that the probe 75 is inserted from the bottom portion of the camera 12 into the film patrone chamber 18. Thus, a state shown in FIG. 4 is realized. When the operation portion 84 is, in a state shown in FIG. 4, pressed toward the front surface (the front surface of the camera 12) of the film patrone chamber 18, the movable portion 78 is moved to the right, thus causing the contact pins 77 disposed in the leading portion of the movable portion 78 to be projected so as to be inserted into the pin receiving holes 22 in the wall member 19. Therefore, the contact pins 77 are connected to the adjustment contacts 23 disposed in the pin receiving holes 22. As a result, signal transmission between the adjustment machine connected to the probe 7B and a circuit in the camera 12 is enabled. Since the engagement portion 8B of the support portion 80 is engaged to the groove portion 88 of the camera 10 when the pin receiving holes 22 are projected due to the operation of depressing the operation portion 84, the probe 75 inserted into the film patrone chamber 18 can stably be supported (secured).

Similarly to the first embodiment, the adjustment of the photographing operation is performed. After the adjustment has been completed, the movable portion 78 is removed to the original position by the operation portion 84. Thus, the contact pins 77 are separated from the pin receiving holes 22 and the adjustment contacts 23. As a result, the contact pins 77 are completely accommodated in the accommodating space 76 in the probe 75 as shown is FIG. 5A. On the other hand, also the engagement portion 3B is removed from the groove portion 38. Therefore, the contact pins 77 do not hinder the introduction and removal of the probe 75 to and from the film patrone chamber 18.

As described above, according to the present invention, the probe is provided with the movable portion that enables the contact pins to be moved forwards/rearwards and the movable portion is projected so that the contact pins and the adjustment contacts of the camera are connected to one another. Therefore, an advantage can be realized in that the prove pins can easily be inserted into the pin receiving holes in the camera of the easy-loading type and therefore the connection between the probe pins and the adjustment contacts in the camera can quickly be established.

Since the engagement portion that projects toward the camera while being integrated with the movable portion and engages with the groove portion of the camera so as to secure the probe is disposed in the bottom portion of the probe, an advantage can be obtained in that the probe can stably be supported and secured in the film patrone chamber.

Although the invention has been described in its preferred form with a certain degree of particularly, it is understood that the present disclosure of the preferred form can be changed in the details of construction and the combination and arrangement of parts may be resorted to without departing from the spirit and the scope of the invention as hereinafter claimed.

What is claimed is:

1. A system unit for adjusting operations of a camera comprising:

an adjustment machine for adjusting a variety of operations of a camera;

a probe having contact pins to transmit signals between said adjustment machine and a circuit in said camera;

pin receiving holes formed in a film patrone chamber of said camera at positions which are different from positions of holes for contacts for detecting film information and at which said contact pins of said probe can be inserted straight; and adjustment contacts disposed on the reverse side of said pin receiving holes, connected to said circuit in said camera and arranged to be brought into contact with said contact pins inserted through said pin receiving holes so as to establish the connection between said probe and said circuit in said camera.

2. A system unit for adjusting the operation of a camera according to claim 1, wherein an exposure detection portion disposed to serve as a portion of said adjustment machine and said probe are attached to one chassis such that setting of said exposure detection portion to an aperture portion of said camera and setting of said probe to a film patrone chamber can be performed simultaneously.

3. A system unit for adjusting the operation of a camera comprising:

an adjustment machine for adjusting a variety of operations of said camera;

pin receiving holes formed in a film patrone chamber of said camera at positions different from positions of holes for contacts for detecting film information;

adjustment contacts disposed on the reverse side of said pin receiving holes and connected to a circuit in said camera;

a probe formed to have a size which permits said probe to be inserted from a bottom portion of said film patrone chamber of said camera of a type loading a film patrone from said bottom portion, said probe being arranged to transmit signals between said adjustment machine and said circuit in said camera; and a movable portion for inserting, into said pin receiving holes formed in a wall surface of said film patrone chamber when contact pins of said probe are projected, said contact pins of said probe which are held so as to be moved forwards/rearwards to project toward a wall of said film patrone chamber from an accommodating position in said probe so that the connection between said contact pins and adjustment contacts of said camera is established.

4. A system unit for adjusting the operation of a camera according to claim 3, wherein an engagement portion is disposed in the bottom portion of said probe, said engagement portion being arranged to project toward said camera integrally with said movable portion so as to be engaged to a groove portion of said camera so that said probe disposed in said film patrone chamber is secured.

\* \* \* \* \*